(12) United States Patent
Hanshew et al.

(10) Patent No.: US 11,271,291 B2
(45) Date of Patent: Mar. 8, 2022

(54) WATCH WITH INTEGRATED ANTENNA CONFIGURATION

(71) Applicant: Garmin Switzerland GmbH, Schaffhausen (CH)

(72) Inventors: Christopher J. Hanshew, Lenexa, KS (US); Abu T. Sayem, Overland Park, KS (US); Yaoxuan Han, Olathe, KS (US)

(73) Assignee: Garmin Switzerland GmbH

( * ) Notice: Subject to any disclaimer, the term of this patent is extended or adjusted under 35 U.S.C. 154(b) by 566 days.

(21) Appl. No.: 16/172,015

(22) Filed: Oct. 26, 2018

(65) Prior Publication Data
US 2019/0131696 A1 May 2, 2019

Related U.S. Application Data

(60) Provisional application No. 62/578,900, filed on Oct. 30, 2017.

(51) Int. Cl.
*H01Q 1/27* (2006.01)
*H01Q 21/28* (2006.01)
(Continued)

(52) U.S. Cl.
CPC ............. *H01Q 1/273* (2013.01); *H01Q 5/35* (2015.01); *H01Q 21/28* (2013.01); *H01Q 9/42* (2013.01); *H01Q 13/10* (2013.01); *H04W 4/02* (2013.01)

(58) Field of Classification Search
CPC ..................................................... H01Q 1/273
See application file for complete search history.

(56) References Cited

U.S. PATENT DOCUMENTS 5,699,319 A * 12/1997 Skrivervik ............ G04G 21/04
343/718
7,486,243 B2 2/2009 Wulff et al. ................. 343/702
(Continued)

FOREIGN PATENT DOCUMENTS

| JP | 2000-187085 | 7/2000 |
| JP | 2003-043167 | 2/2003 |
| JP | 2003-294869 | 10/2003 |

OTHER PUBLICATIONS

Printout from http://amazfitcentral.com/2017/08/13/a1612-amazfit-pace-internal-pholos-teardown-by-the-tcc/ published prior to Oct. 25, 2018.
(Continued)

*Primary Examiner* — Ab Salam Alkassim, Jr.
(74) *Attorney, Agent, or Firm* — Samuel M. Korte; Max M. Ali

(57) ABSTRACT

An electronic device comprises a housing, a frame, a location determining element, and a first antenna. The housing includes an internal cavity, a lower wall configured to contact a wearer's wrist, and a first side wall coupled to the lower wall. The first side wall includes an inner surface. The frame has a second side wall which includes an outer surface. The frame is positioned within the housing such that the internal cavity is formed partly by the lower wall and the second side wall. The location determining element is configured to determine a current geolocation of the electronic device based on a location signal. The first antenna is configured to receive the location signal. The first antenna is positioned between the inner surface of the first side wall and the outer surface of the second side wall and extends along a first portion of the perimeter of the frame.

20 Claims, 13 Drawing Sheets

(51) Int. Cl.
*H01Q 5/35* (2015.01)
*H04W 4/02* (2018.01)
*H01Q 9/42* (2006.01)
*H01Q 13/10* (2006.01)

(56) References Cited

U.S. PATENT DOCUMENTS

| | | | | |
|---|---|---|---|---|
| 9,257,740 | B2* | 2/2016 | Lyons | G01S 19/24 |
| 10,431,878 | B2* | 10/2019 | Robinson | H01Q 1/273 |
| 10,447,080 | B2* | 10/2019 | Jung | H01Q 21/28 |
| 10,516,205 | B2* | 12/2019 | Wu | H01Q 1/273 |
| 10,879,601 | B2* | 12/2020 | Wu | H01Q 1/243 |
| 10,944,158 | B2* | 3/2021 | Sayem | G06F 1/1698 |
| 11,005,193 | B2* | 5/2021 | Kim | H01Q 7/00 |
| 2014/0225786 | A1* | 8/2014 | Lyons | G04G 21/04 |
| | | | | 343/702 |
| 2016/0013544 | A1* | 1/2016 | Lyons | G04G 21/04 |
| | | | | 343/702 |
| 2016/0124396 | A1* | 5/2016 | Choi | H01Q 1/273 |
| | | | | 368/281 |
| 2016/0164165 | A1 | 6/2016 | Kwong et al. | |
| 2016/0254587 | A1* | 9/2016 | Jung | H02J 50/12 |
| | | | | 343/702 |
| 2017/0179581 | A1* | 6/2017 | Puuri | H01Q 7/005 |
| 2017/0365916 | A1* | 12/2017 | Wu | H01Q 1/273 |
| 2017/0373381 | A1* | 12/2017 | Robinson | H01Q 1/243 |
| 2018/0006364 | A1* | 1/2018 | Wu | H01Q 1/273 |
| 2018/0062245 | A1* | 3/2018 | Wu | H01Q 1/273 |
| 2018/0083342 | A1* | 3/2018 | Lepe | H01Q 1/243 |
| 2018/0128924 | A1* | 5/2018 | Wu | H01Q 1/243 |
| 2019/0215794 | A1* | 7/2019 | Sayem | H04W 64/00 |
| 2019/0271950 | A1* | 9/2019 | Kadmiri | G04B 37/22 |
| 2019/0379105 | A1* | 12/2019 | Sayem | H01Q 5/335 |

OTHER PUBLICATIONS

Printout from https:/www.ifixit.com/Guide/Garmin+Vivoactive+Motherboard+Replacement/52252 published prior to Oct. 25, 2018.
Printout from https://www.ifixit.com/Teardown/Apple+Watch+Series+3+Teardown/97521 published prior to Oct. 25, 2018.
Printout from https://www.ifixit.com/Teardown/Motorola+Moto+360+Teardown/28891 published prior to Oct. 25, 2018.
Printout from https://learn.adafruit.com/moto-360-smartwatch-teardown/inside-the-moto-360 published prior to Oct. 25, 2018.
Printout from https://news.samsung.com/global/in-depth-look-the-parts-and-pieces-that-make-the-gear-s3-tick published prior to Oct. 25, 2018.
Printout from https://www.ifixit.com/Teardown/Motorola+Droid+RAZR+Teardown/7048 published prior to Oct. 25, 2018.
Printout from https://www.ifixit.com/Teardown/Motorola+Moto+X+Teardown/16867 published prior to Oct. 25, 2018.
International Search Report and Written Opinion from corresponding PCT/US2018/057809 filed Oct. 26, 2018.

* cited by examiner

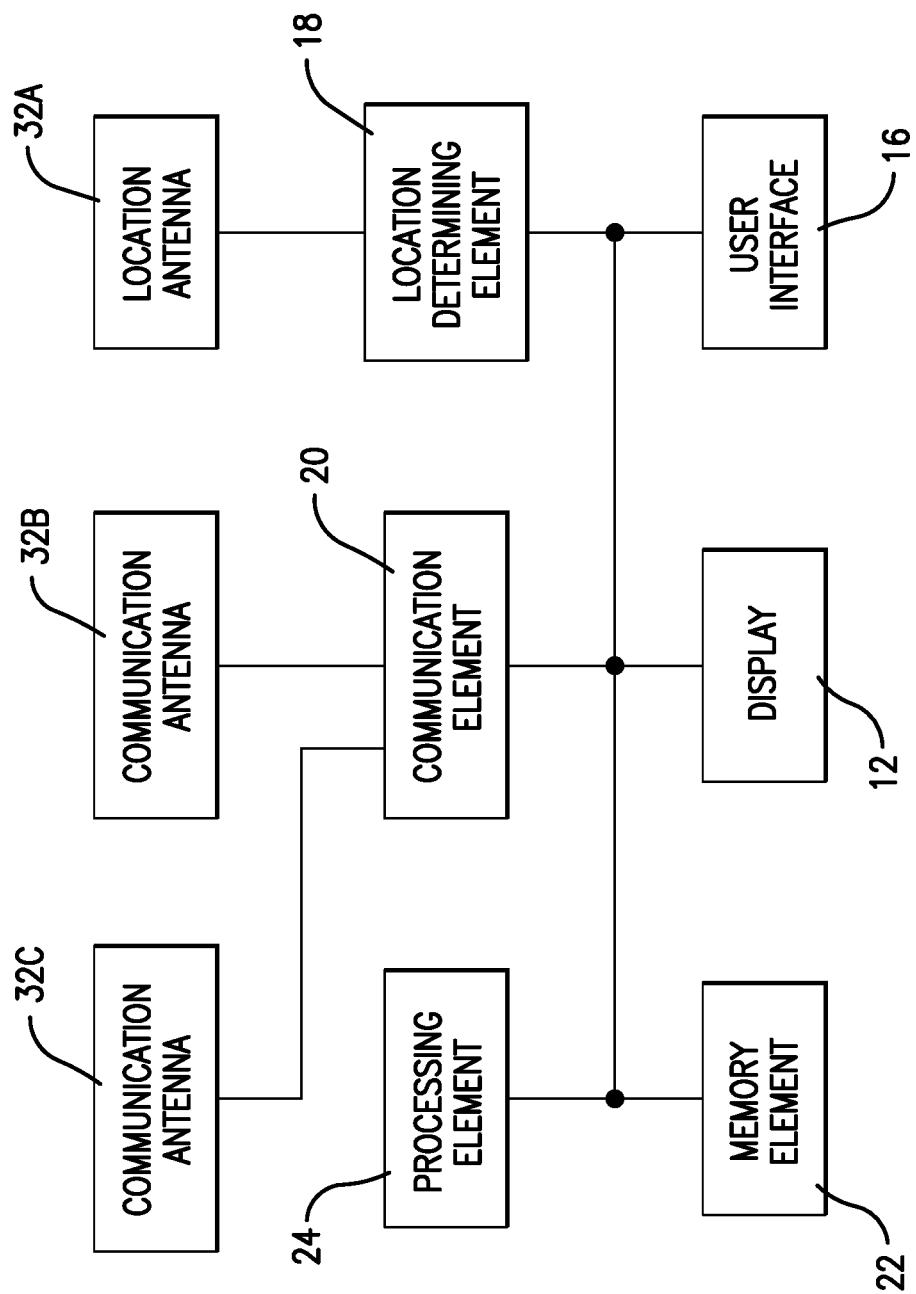

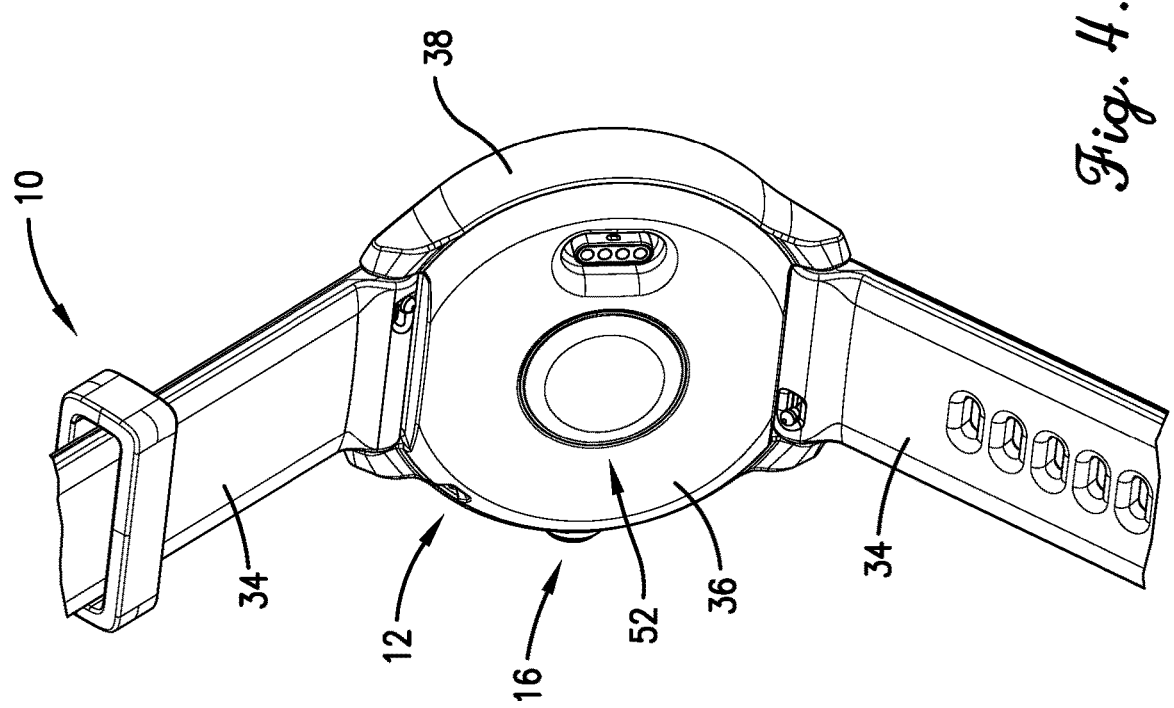
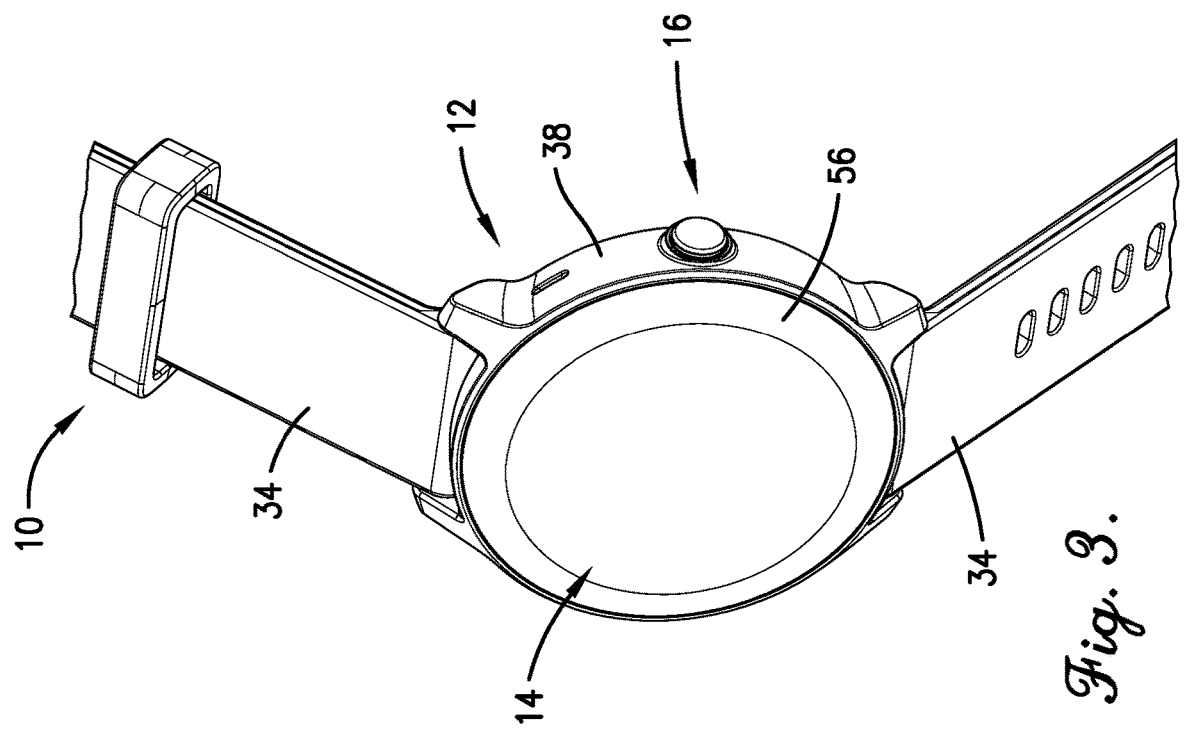

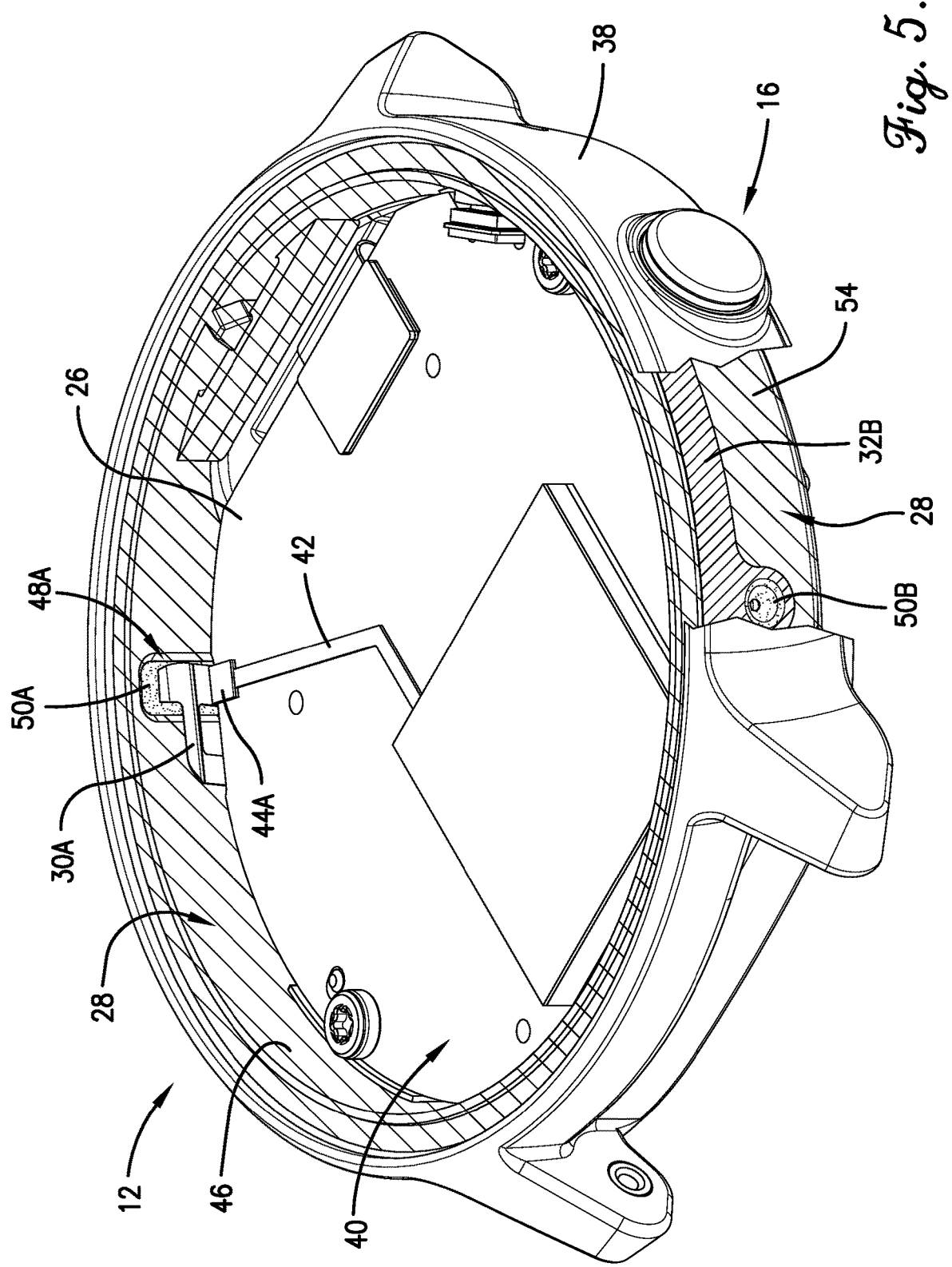

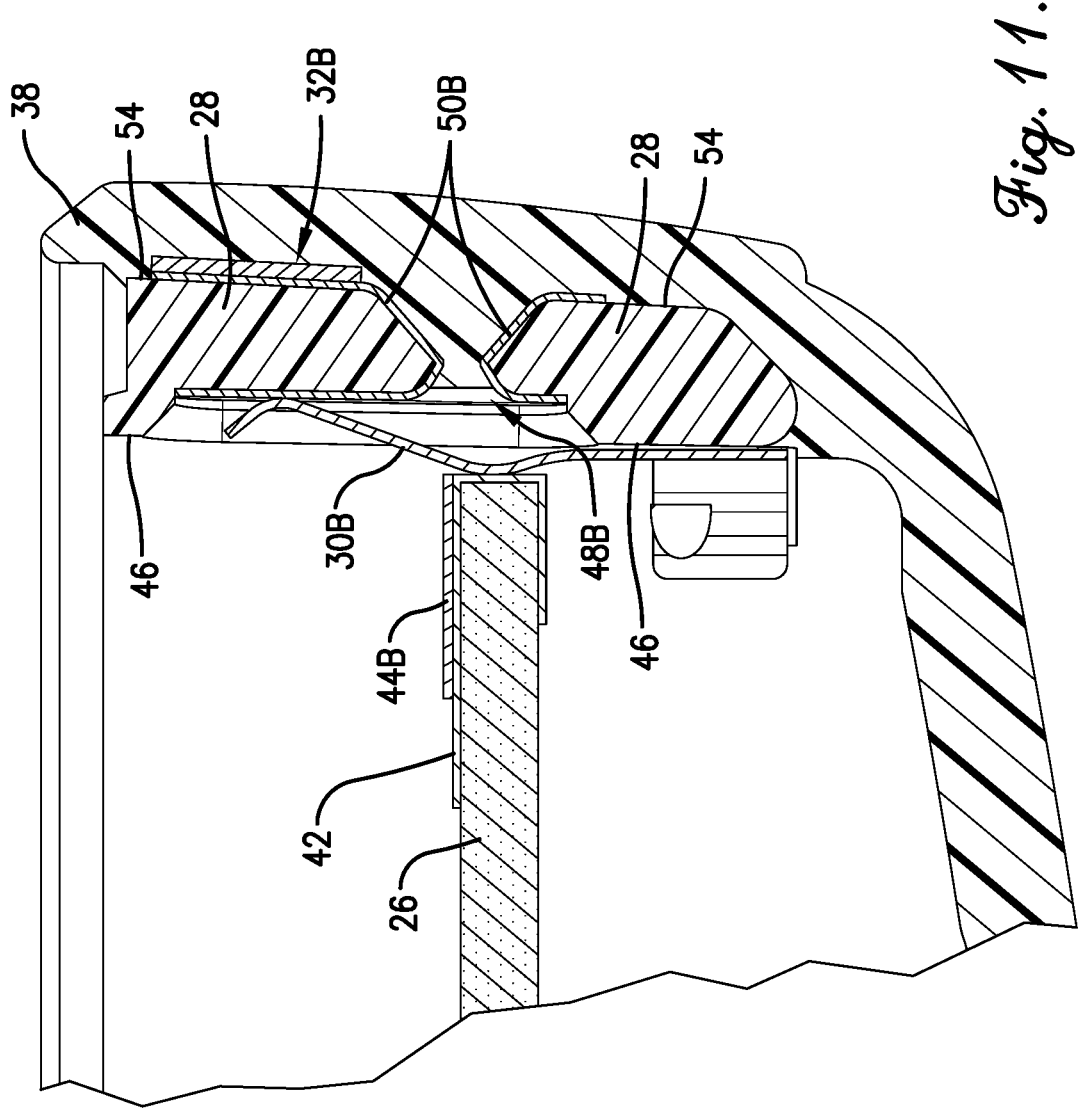

WATCH WITH INTEGRATED ANTENNA CONFIGURATION

RELATED APPLICATIONS

The present application claims the benefit under 35 U.S.C. § 119(e) of U.S. Provisional Application Ser. No. 62/578,900, filed Oct. 30, 2017, and entitled "Watch with Integrated Antenna Configuration," which is herein incorporated by reference in its entirety.

BACKGROUND

Wrist-worn electronic devices often include functionality that may be used to track wearers' current locations, distances traveled, velocities, and other performance metrics or data. This functionality may be provided by receiving positional information from a satellite-based positioning system such as the global positioning system (GPS). In addition, such devices may communicate wirelessly with other electronic devices, systems, or networks to monitor a user's activities, running or biking performance, upload and download data, receive messages and information, and so forth. The communication protocols utilized to transmit and receive information may include Bluetooth, Wi-Fi, NFC, or cellular signaling protocols. The electronic device may include one or more antennas that may be utilized to receive signals from GPS satellites and wirelessly communicate with other electronic devices.

SUMMARY

Embodiments of the present technology provide a wrist-worn electronic device with an improved antenna configuration. The electronic device broadly comprises a housing, a frame, a location determining element, a communication element, and a first antenna. The housing includes a lower wall configured to contact a wearer's wrist and a first side wall coupled to the lower wall. The first side wall includes an inner surface. The frame forms a second side wall of the housing and includes an inner surface and an outer surface. The frame is positioned within the housing such that an internal cavity is formed in part by the lower wall and the second side wall. The location determining element is configured to determine a current geolocation of the electronic device based on a location signal. The communication element is configured to process a communication signal. The first antenna is in electronic communication with the location determining element and is configured to receive the location signal. The first antenna is positioned between the inner surface of the first side wall and the outer surface of the second side wall and extends along a first portion of the perimeter of the frame.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

BRIEF DESCRIPTION OF THE DRAWING FIGURES

Embodiments of the present technology are described in detail below with reference to the attached drawing figures, wherein:

FIG. 2 is a schematic block diagram illustrating at least a portion of the electronically coupled functional components of the electronic device of FIG. 1;

FIG. 3 is a front perspective view of the wrist-worn electronic device with a portion of the wrist band cut away;

FIG. 4 is a rear perspective view of the wrist-worn electronic device with a portion of the wrist band cut away;

FIG. 5 is a front perspective view of the wrist-worn electronic device with a display and the wrist band removed and a portion of a housing cut away revealing portions of a first antenna, a frame, and an internal cavity with a printed circuit board, a first signal trace, a first signal terminal, and a first intermediate connector;

FIG. 11 is a sectional view of the wrist-worn electronic device cut along the line 11-11 of FIG. 9 illustrating the printed circuit board, the first signal trace, the first signal terminal, the first intermediate connector, an electrically conductive element, the frame, and the housing;

Figure 1:
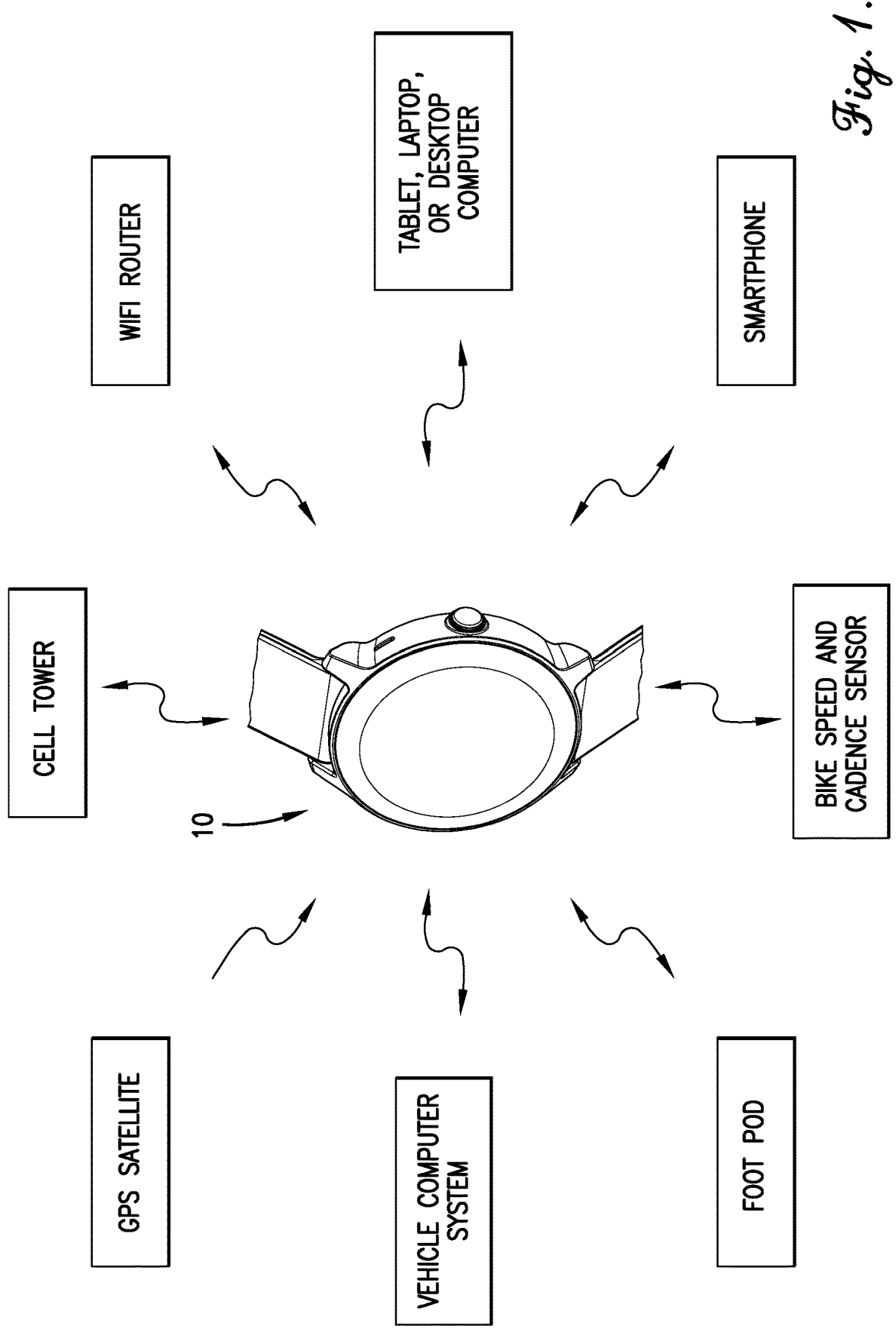
FIG. 1 is an environmental view of a wrist-worn electronic device incorporating an improved antenna configuration, constructed in accordance with embodiments of the present technology, depicting a plurality of other devices or systems with which the electronic device may communicate, the wrist-worn device including a wrist band with a portion of the wrist band cut away.

The drawing figures do not limit the present technology to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Embodiments of the present technology relate to a wrist-worn electronic device that can be worn on a user's wrist and that communicates wirelessly with other devices, systems, and networks. The wrist-worn electronic device may be a fitness watch, a wrist-worn smart phone, a wrist-worn navigation device, or other wearable multi-function electronic devices that include a housing and a wrist band, strap, or other attachment mechanism. Although the electronic device is typically worn on a wrist, it may also be worn on other parts of the body such as the forearm or the upper arm. The electronic device may be used to monitor the user's current geographic location, a distance traveled by the user, a velocity of travel in a direction, and other performance metrics based on location signals received from a satellite-based positioning system such as the global positioning system (GPS). The electronic device may be electronically paired with other devices such as a vehicle's computer system, a heart rate monitor worn around the user's chest, a foot pod attached to the user's shoe to measure jogging or running cadence and distance, attached to a crank arm or wheel hub of the user's bicycle to measure biking performance (e.g., bike speed, pedaling cadence, etc.), and so forth. Furthermore, the electronic device may be able to communicate with smartphones, tablets, laptop or desktop computers, Wi-Fi routers, cellular towers, and the like, to enable the user to transmit and receive information. For instance, the electronic device may allow the user to upload activity data stored in the electronic device, download apps for installation and use on the electronic device, download or stream music, send or receive text messages, emails, and weather alerts, and so on. Thus, the electronic device may utilize or process location signals received from global positioning system (GPS) satellites and communication signals utilizing Bluetooth™, Wi-Fi, or cellular protocols, and so forth.

Typically, simultaneously sending or receiving information from multiple sources requires use of a plurality of antennas incorporated within the housing of the device. It is a common practice to position the antennas sufficiently apart from one another and the electronic circuitry within the device to reduce undesirable interference and noise. However, for a wrist-worn items, the size (e.g., diameter, thickness, etc.) of the electronic device is typically limited due to the amount of surface area that the electronic device housing occupies on the user's wrist. Often, a housing having a smaller size is desirable for many users. Therefore, it is a challenge to sufficiently space a plurality of antennas apart from other antennas and the electronic circuitry while minimizing the overall size of the electronic device housing.

Embodiments of the present technology provide a wrist-worn electronic device with an improved antenna configuration comprising a housing, a frame, and one or more antennas. Each antenna may receive and/or transmit signals having a unique frequency and signaling protocol. The housing includes at least a first side wall enclosing the perimeter thereof. An outer surface of the first side wall is an exposed, outer surface of a portion of the housing and an inner surface of the first side wall is opposite the outer surface. The frame is positioned within the housing and forms a second side wall of the housing. The frame may be shaped such that the frame, which forms the second side wall, contacts the inner surface of the first side wall. The one or more antennas are positioned between the first side wall and the second side wall. The present technology allows the antennas to be located further radially outward from a center of the housing than conventional wrist-worn device housings of the same size.

Embodiments of the technology will now be described in more detail with reference to the drawing figures. Referring initially to FIGS. 1-4, an exemplary wrist-worn electronic device 10 is illustrated. The electronic device 10 broadly comprises a housing 12, a display 14, a user interface 16, a location determining element 18, a communication element 20, a memory element 22, and a processing element 24. In the embodiments, the electronic device 10 includes a bezel 56 around the perimeter of the display 14. FIGS. 5-11 detail embodiments incorporating a printed circuit board 26, a frame 28, a plurality of intermediate connectors 30, and a plurality of antennas 32 within the housing 12 of the electronic device 10. The electronic device 10 may also include a wrist band 34, a strap, or other attachment mechanisms.

The housing 12, as shown in FIGS. 1 and 3-6, generally houses or retains other components of the electronic device 10 and may include or couple to the wrist band 34. The housing 12 may be formed from various polymers or plastics using techniques that may involve injection molding. In embodiments, the housing 12 includes one or more conductive elements, which may be formed of metal, may not connect to the plurality of antennas 32 within the housing 12. Such conductive elements may provide aesthetic appeal or structural support for housing 12.

The housing 12 may include a lower wall 36, the first side wall 38, and an internal cavity 40. The lower wall 36 includes a lower, outer surface that contacts the user's wrist while the user is wearing the electronic device 10. In some embodiments, the lower wall 36 may be separate from first side wall 38 and non-removably attached to the first side wall 38 and the frame 28 to form a lower portion of the internal cavity 40 during manufacture of the housing 12. In other embodiments, the lower wall 36 and the first side wall 38 may be formed as a single component that is attached to frame 28 to form the lower portion of the internal cavity 40. For instance, the lower wall 36 and the first side wall 38 may form a unibody lower housing 12. The lower wall 36 may include an optical module 52 containing one or more LEDs that output light into the user's skin and photodiodes that receive a reflection of the light to enable processing element 24 to determine one or more physiological characteristics for the user. The first side wall 38 couples to the lower wall 36 at a lower edge of the first side wall 38. In exemplary embodiments that are shown in the figures, the housing 12 includes a single first side wall 38, with inner and outer surfaces, that has a circular shape that generally forms a hollow cylinder. In other embodiments, the first side wall 38 may have a rectangular, oval or elliptical shape. In still other embodiments, the first side wall 38 of housing 12 may include a plurality of first side walls 38 that collectively form one of a plurality of geometric or polygonal shapes, such as rectangular, square, triangular, hexagonal, octagonal, and so forth.

The first side wall 38 may include one or more through holes or openings extending from the inner surface to the outer surface. Components of the user interface 16, such as one or more pushbuttons or rotating knobs, may be positioned in and pass through the through holes or openings. An upper surface of the lower wall 36 forms at least a portion of the boundary of the internal cavity 40.

The display 14, as shown in FIGS. 1-3, generally presents the information mentioned above, such as activity data, apps, text messages, emails, weather alerts, time of day, a current location, and the like. The display 14 may include a transparent material, such as glass or sapphire, and may be implemented in one of the following technologies: light-emitting diode (LED), organic LED (OLED), Light Emitting Polymer (LEP) or Polymer LED (PLED), liquid crystal display (LCD), thin film transistor (TFT) LCD, LED side-lit or back-lit LCD, or the like, or combinations thereof. In exemplary embodiments that are shown in the figures, the display 14 has a round or circular shape. In general, the display 14 may possess a shape that corresponds to the shape formed by the one or more first side walls 38 of the housing 12. A lower surface of the outer edges or perimeter of the display 14 may couple to the first side wall 38. In such embodiments, a lower surface of the display 14 forms at least a portion of the boundary of the internal cavity 40. The display 14 is separate from first side wall 38 and is non-removably attached to the first side wall 38 and the frame 28 to form an upper portion of the internal cavity 40 during manufacture of the housing 12. In other embodiments, the outer edges or perimeter of the display 14 may couple to the bezel 56 and a lower surface of the outer edges or perimeter of the bezel 56 is at least partially positioned above and couples to an upper surface of the first side wall 38. In embodiments, the lower surface of the outer edges or perimeter of the bezel 56 is at least partially positioned above and couples to an upper surface of the frame 28 in addition to the first side wall 38.

The user interface 16 generally allows the user to directly interact with the electronic device 10 and may include pushbuttons, rotating knobs, or the like. In exemplary embodiments of FIGS. 1 and 3-5, the housing 12 may include one or more pushbuttons located in the through holes of the first side wall 38 that function as at least a portion of the user interface 16. In various embodiments, the display 14 may also include a touch screen occupying the entire display 14, or a portion thereof, so that the touch screen of display 14 functions as a portion of the user interface 16. The touch screen may allow the user to interact with the electronic device 10 by physically touching, swiping, or gesturing on areas of the display 14.

The bezel 56 may form an upper surface of the housing 12 and may generally cover the perimeter edges of or encircle display 14. The bezel 56 may be a ring shaped to conform to the shapes of the upper housing 12 and display 14 such that bezel 56 may be positioned around display 14. The bezel 56 may have an outer perimeter, or outer circumference, that is substantially the same shape as the lower portion of the housing 12 and an inner perimeter, or inner circumference, that is substantially the same shape as the outer perimeter of the display 14. For example, the bezel 56 may have an inner edge with dimensions that are smaller than or approximately equal to the perimeter dimensions of the display 14 and an outer edge with dimensions that are approximately equal to the perimeter dimensions of the first side wall 38 of the housing 12. Thus, the bezel 56 may be circular, square, or rectangular with a central opening through which the display 14 may be viewed. In the exemplary embodiments shown in the figures, bezel 56 may have an annular shape. In various embodiments, the bezel 56 may be aligned with the lens of display 14.

The bezel 56 may be formed from any material. For example, the bezel 56 may be formed of a transparent material (e.g., glass, sapphire, etc.), plastic, or an electrically conductive material (e.g., metal, metallic material, etc.). In embodiments in which the bezel 56 is formed of a transparent material, the bezel 56 may be integral to a transparent material of the display 14 such that the display 14 and bezel 56 form a single element. The bezel 56 may be positioned on or fixedly attached to an upper surface of the first side wall 38 and, in some embodiments, to an upper surface of the frame 28. In some embodiments, the bezel 56 may be able to rotate in place, roughly around the display 14. In embodiments, the bezel 56 may be integral to an upper portion of housing 12. For example, bezel 56 may be a raised or flush portion of the upper portion of the housing 12, with a central opening through which display 14 may be viewed, and the bezel 56 may be positioned above the first side wall 38.

The location determining element 18 generally determines a current geolocation of the electronic device 10 and may receive and process radio frequency (RF) signals from a multi-constellation global navigation satellite system (GNSS) such as the global positioning system (GPS), the GLONASS system, the Galileo system, or the like. The location determining element 18 may include satellite navigation receivers, processors, controllers, other computing devices, or combinations thereof, and memory. The location determining element 18 may process a signal, referred to herein as an electronic "location signal", received from one or more satellites, that includes data and information utilized by the location determining element 18 to determine a current geolocation of the electronic device 10. The location determining element 18 receives the location signal from one of the antennas 32, discussed in more detail below. The current geolocation determined by location determining element 18 may include geographic coordinates, such as the latitude and longitude, of the current location of the electronic device 10. The location determining element 18 may communicate the determined current geolocation to the processing element 24, the memory element 22, or both.

Although embodiments of the location determining element 18 may include a satellite navigation receiver, it will be appreciated that other location-determining technology may be used. Signals received from cellular towers or any customized transmitting radio frequency towers can be used to determine the geographic location of the electronic device 10. For example, the location determining element 18 may determine a current location of the electronic device 10 by receiving data from at least three transmitting towers having known locations and then performing basic triangulation calculations to determine the relative position of the electronic device 10 with respect to the transmitting locations. With such a configuration, any standard geometric triangulation algorithm can be used to determine the location of the electronic device 10. The location determining element 18 may also include or be coupled with a pedometer, accelerometer, compass, or other dead-reckoning components which allow it to determine the location of the device 10. The location determining element 18 may determine the current geographic location through a communications network, such as by using Assisted GPS (A-GPS), or from another electronic device. The user interface 16 may be utilized by the user to provide location determining element 18 with location data.

The communication element 20 generally allows communication with external systems and devices. The communication element 20 may include signal or data transmitting and receiving circuits, such as amplifiers, filters, mixers, oscillators, digital signal processors (DSPs), and the like. Various combinations of these circuits may form a transceiver, which transmits, receives, and processes signals such as the ones listed in the following discussion. The communication element 20 may establish wireless communication with external systems and devices by utilizing radio frequency (RF) signals and/or data that comply with communication standards such as cellular 2G, 3G, or 4G, LTE, 5G, the Institute of Electrical and Electronics Engineers (IEEE) 802.11 standard such as Wi-Fi, the IEEE 802.16 standard such as WiMAX, Bluetooth™, or combinations thereof. In addition, the communication element 20 may also utilize communication standards such as ANT, ANT+, Bluetooth™ low energy (BLE), the industrial, scientific, and medical (ISM) band at 2.4 gigahertz (GHz), or the like, to wirelessly communicate with external systems and devices. The communication element 20 may be in communication with the processing element 24 and the memory element 22.

In various embodiments, the electronic device 10 may be configured to utilize a plurality of communication protocols or standards to communicate with external systems and devices. For example, the communication element 20 may include one or more transceivers configured to transmit and receive communication signals utilizing Bluetooth™, Wi-Fi, and cellular signals in order to communicate with the external systems and devices. For example, the electronic device 10 may utilize a first communication protocol, such as a cellular 4G or LTE protocol, to establish communication with external systems and devices by communicating through a nearby cell tower. Similarly, the electronic device 10 may utilize a second communication protocol, such as Bluetooth™, to establish communication with external sensor devices (e.g., a foot pod, a bike speed and cadence sensor, etc.) or other electronic devices (e.g., a smartphone, a tablet, a laptop, a desktop computer, etc.). As detailed below, the communication element 20 may be coupled and in electronic communication with two or more antennas 32. Thus, the communication element 20 may transmit and receive a first communication signal utilizing a first communication protocol using a first antenna 32 and a second communication signal utilizing a second communication protocol using the second antenna 32 in a substantially simultaneous manner.

The memory element 22 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 22 may be embedded in, or packaged in the same package as, the processing element 24. The memory element 22 may include, or may constitute, a "computer-readable medium". The memory element 22 may store the instructions, code, code statements, code segments, software, firmware, programs, applications, apps, services, daemons, or the like that are executed by the processing element 24. The memory element 22 may also store data that is received by the processing element 24 or the device in which the processing element 24 is implemented. The processing element 24 may further store data or intermediate results generated during processing, calculations, and/or computations as well as data or final results after processing, calculations, and/or computations. In addition, the memory element 22 may store settings, data, documents, sound files, photographs, movies, images, databases, and the like.

The processing element 24 may comprise one or more processors. The processing element 24 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 24 may generally execute, process, or run instructions, code, code segments, code statements, software, firmware, programs, applications, apps, processes, services, daemons, or the like. The processing element 24 may also include hardware components such as registers, finite-state machines, sequential and combinational logic, and other electronic circuits that can perform the functions necessary for the operation of the current invention. In certain embodiments, the processing element 24 may include multiple computational components and functional blocks that are packaged separately but function as a single unit. The processing element 24 may be in electronic communication with the other electronic components through serial or parallel links that include universal busses, address busses, data busses, control lines, and the like.

The printed circuit board 26, as shown in FIGS. 5, 6, and 9-11, generally provides a substrate for supplying electric power to, and electronic communication between, the electronic components of the electronic device 10, such as the location determining element 18, the communication element 20, the memory element 22, and the processing element 24. The printed circuit board 26 may be constructed with a first (top) side and an opposing second (bottom) side. The printed circuit board 26 may also include multiple electrically conductive layers with a top conductive layer placed on the first side, a bottom conductive layer placed on the second side, one or more inner conductive layers positioned between the first and second sides, and an insulating layer between each pair of adjacent conductive layers. The insulating layers may be formed from rigidized material that includes various combinations of fiberglass, woven glass, matte glass, cotton paper, phenolic cotton paper, polyester, epoxies, epoxy resins, and the like. Each conductive layer of the printed circuit board 26 may include one or more conductive electronic signal or electrical power or ground traces 42, one or more signal, power, or ground pads, full or partial power planes, or full or partial ground planes. The conductive layers may be formed from metals typically including copper, but also including nickel, aluminum, gold, silver, palladium, zinc, tin, lead, and the like. In addition, the printed circuit board 26 may include plated through hole vias, blind vias, buried vias, and the like. The electronic components may be implemented in packages which are mounted, or retained, on the top side, the bottom side, or both sides. The electronic components positioned on the printed circuit board 26 may communicate with one another and the one or more antennas 32 through electronic signal traces 42 passing on or through the printed circuit board 26.

Furthermore, the printed circuit board 26 may include a plurality of signal terminals 44 in electronic communication with the location determining element 18, the communication element 20, the memory element 22, and the processing element 24, through the electronic signal traces 42. In embodiments, a first signal terminal 44A and a second signal terminal 44B, each formed from electrically conductive material, may be in electronic communication with the location determining element 18 and the communication element 20, respectively. Each signal terminal 44 may include a first pad deposited on the top side of the printed circuit board 26 adjacent to an edge of the printed circuit board 26, a second pad deposited on the bottom side adjacent to the edge, and an edge section deposited on the edge that electrically connects the first pad and the second pad. Each signal terminal 44 is also electrically connected to one or more electronic signal traces 42 that electrically connect the signal terminal 44 to one or more electronic components, such as the location determining element 18, the communication element 20, and the processing element 24. In other embodiments, one or more signal terminals 44 may electrically connect to electric ground or other voltage levels. In embodiments, the printed circuit board 26 may serve as a ground plane for the one or more antennas 32.

Given that the printed circuit board 26 may be retained within the housing 12, the printed circuit board 26 may have an outline shape that is generally similar and corresponds to the shape of the internal cavity 40, which is formed by the lower surface of the display 14, the upper surface of the lower wall 36 and an inner surface 46 of the frame 28. In exemplary embodiments, the shape of the internal cavity 40, defined primarily by the inner surface of the frame 28. As a result, if the inner surface of the frame 28 forms a circular or rectangular shape, the outline shape of the printed circuit board 26 may be circular or rectangular. Other outline shapes of the printed circuit board 26 are possible including hexagonal, octagonal, or square.

The frame 28 forms the second side wall and provides structural support for housing 12 when combined with first side wall 38. The frame 28 may generally be shaped to fit within housing 12 and include a central opening within which a plurality of components, such as a printed circuit board and a battery, may be positioned. For example, as shown in FIGS. 5-8, and 10-18, the frame 28 may be shaped as a ring and extend along the inner surface of the first side wall 38. As a result, the frame 28 has a smaller radius or diameter than a radius or diameter of the first side wall 38 such that the frame 28 fits within the first side wall 38. In other embodiments, the frame 28 may be shaped to fit within a housing 12 having a rectangular or square shape (in a top (front) view) and include a central opening within which a plurality of components may be positioned. The display 12 has a rectangular or square shape that corresponds to the shape of the central opening. In such embodiments, the frame 28 has a shorter width and length than a width and length of the first side wall 38 such that the frame 28 fits within the first side wall 38 of a rectangular or square housing 12.

In some embodiments, the frame 28 extends along the entirety to the inner surface of the first side wall 38 such that the inner surface 46 of frame 28 forms a perimeter of the internal cavity 40 when the frame 28 is contacting and combined with the first side wall 38. In other embodiments, the frame extends along a portion of the inner surface of the first side wall 38 such that a portion of inner surface 46 of frame 28 contacting and combined with the first side wall 38 and the remaining portion of the first side wall 38 that is not in contact with the frame 28 collectively form a perimeter of the internal cavity 40 when the frame 28 is combined with the first side wall 38.

The frame 28 is positioned within the housing 12 such that the outer surface 54 of the frame 28 is in contact with the inner surface of the first side wall 38. In embodiments, the frame 28 integrally mates with the first side wall 38 to collectively form a side wall for housing 12. Accordingly, the frame 28 forms a side wall of the housing 12 and has an inner surface 46 that has a similar overall shape and structure to the first side wall 38 of the housing 12. In exemplary embodiments, the inner surface 46 of the frame 28 forms a portion of internal cavity 40 when combined with the lower surface of the display 14 and the upper surface of the lower wall 36. In embodiments, the bezel 56 may couple to the display 14, frame 28 and first side wall 38 to form a portion of the internal cavity 40. As shown in FIGS. 5-8, and 10-18, the frame 28 may have a substantially circular shape that forms a hollow cylinder with inner surface 46 and an outer surface 54 that contacts one or more antennas 32 and the first side wall 38.

The frame 28 may include one or more through holes 48, such as a first through hole 48A and a second through hole 48B, each of which extends from the inner surface 46 to the outer surface 54 that contacts one or more antennas 32 and the first side wall 38. The frame 28 may further include a plurality of electrically conductive elements 50, each formed from electrically conductive material, such as copper, electrically coupling the one or more signal terminals 44 with the one or more antennas 32. For example, the frame 28 may include a first electrically conductive element 50A and a second electrically conductive element 50B. The first electrically conductive element 50A is positioned within the first through hole 48A, and the second electrically conductive element 50B is positioned within the second through hole 48B. Each electrically conductive element 50 may be applied to or deposited on the inner surface 46 of the frame 28 in its associated through hole 48. In addition, each electrically conductive element 50 may function as, or provide, a feed point for the electronic signal to be communicated or pass through to its associated antenna 32. Accordingly, the frame 28 may include more or fewer through holes 48 and electrically conductive elements 50 based on the number of antennas 32 incorporated within the housing 12 of the electronic device 10. In other embodiments, the one or more electrically conductive elements 50 may be configured to provide a feed point, or access point, for electric ground or other electric voltage levels.

The frame 28 may further include features, such as cutouts or openings, that match or correspond to features of the first side wall 38 to enable the combination to serve as a side wall of the housing 12. The frame 28 is positioned within the housing 12 such that the portions of the outer surface 54 of the frame 28 that do not contact the antennas 32 contact the inner surface of the first side wall 38.

The intermediate connectors 30, as shown in FIGS. 5, 6, and 9-11, generally provide electrical connection from the signal terminals 44 along a perimeter of the printed circuit board 26 to the electrically conductive elements 50 positioned on the frame 28. The intermediate connectors 30 are formed from electrically conductive material, such as copper, and may include wires, jumpers, flexible conductors, pogo pins, or the like, or combinations thereof. In exemplary embodiments, the intermediate connectors 30 may also incorporate a clamp and/or spring structures that mechanically connect to the printed circuit board 26 and hold the printed circuit board 26 in place within the housing 12.

In embodiments, the antennas 32, as shown in FIGS. 5-8, 10-11, and 14-18, include a location receiving antenna 32A, a first communication antenna 32B, and a second communication antenna 32C. Each antenna 32 is operable to convert wireless RF electromagnetic radiation (a wireless signal) received by the antenna 32 into a corresponding electronic signal and to convert an electronic signal into a corresponding wireless signal transmitted by antenna 32. The antennas 32 may be configured or implemented as slot antennas, microstrip patch antennas, linear antennas, inverted F-antennas (IFA), inverted L antennas (ILA), dipole antennas, or the like. In some embodiments, all of the antennas 32 are of the same configuration. In other embodiments, each antenna 32 may have a different configuration, or only a portion of the antennas 32 have the same configuration. Each antenna 32 also has a length that is proportional to a wavelength, or a portion thereof, such as a quarter wavelength, of the wireless signal that it transmits and/or receives.

The location receiving antenna 32A wirelessly receives a location signal from one or more GNSS constellation systems and communicates the location signal to the location determining element 18. The first communication antenna 32B wirelessly transmits and receives a first RF signal utilizing a first communication protocol. The first communication antenna 32B communicates the first communication signal to the communication element 20. As discussed above, the first communication protocol may include cellular or mobile phone communication standards, such as 4G, LTE, or the like. Similarly, the second communication antenna 32C wirelessly transmits and receives a second RF signal utilizing a second communication protocol. The second communication antenna 32C communicates the second communication signal to the communication element 20. As discussed above, the second communication protocol may include a combination of ANT, ANT+, Bluetooth™, BLE, the ISM band, or other protocols that utilize a similar range of communication frequencies around approximately 2.4 GHz. The communication element 20 may transmit and receive communication signals using the first and second communication antennas 32B, 32C in a substantially simultaneous manner.

Figure 8:
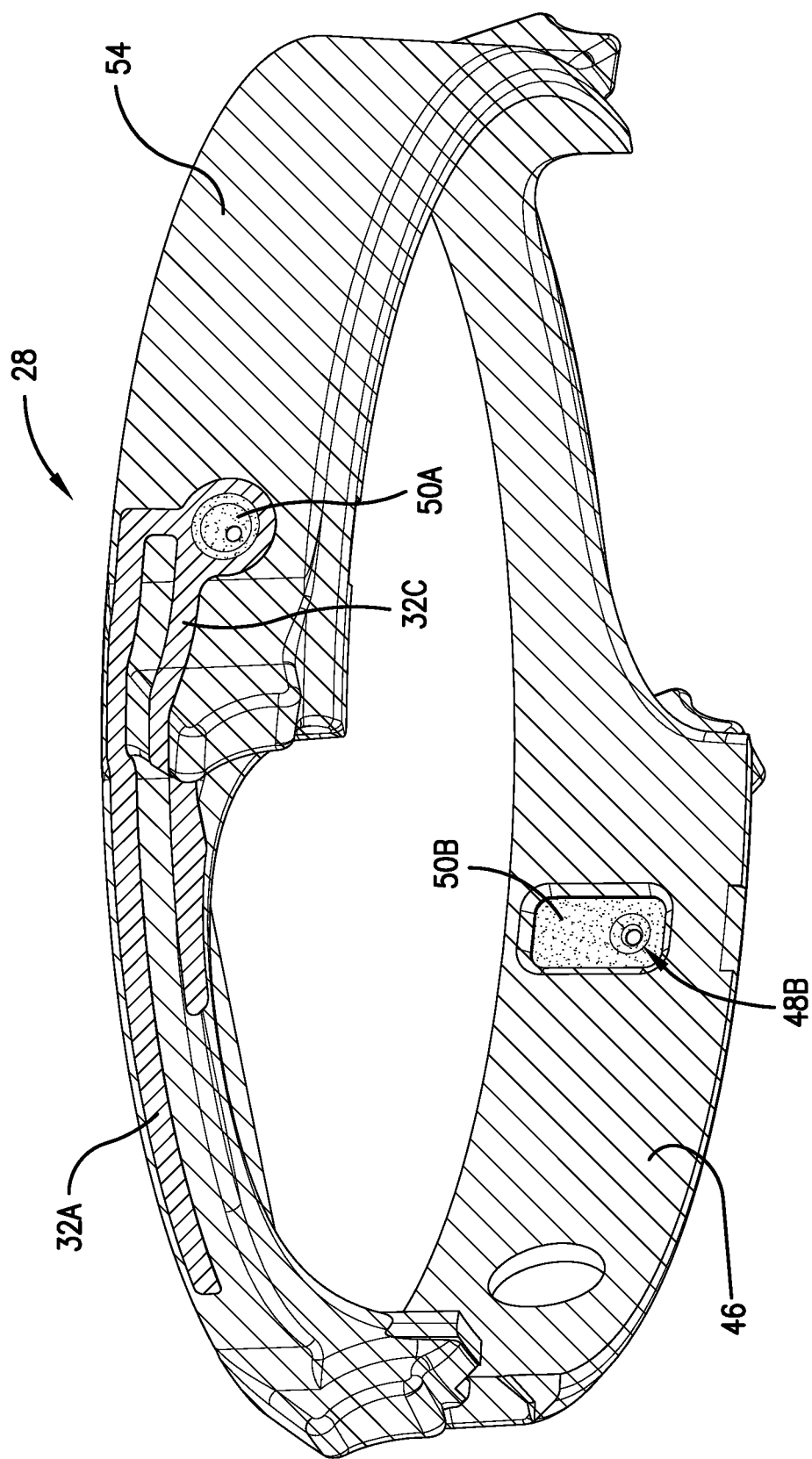
FIG. 8 is a bottom perspective view of the frame rotated 180 degrees from the view of FIG. 7, the view revealing the second antenna and the third antenna.
Figure 9:
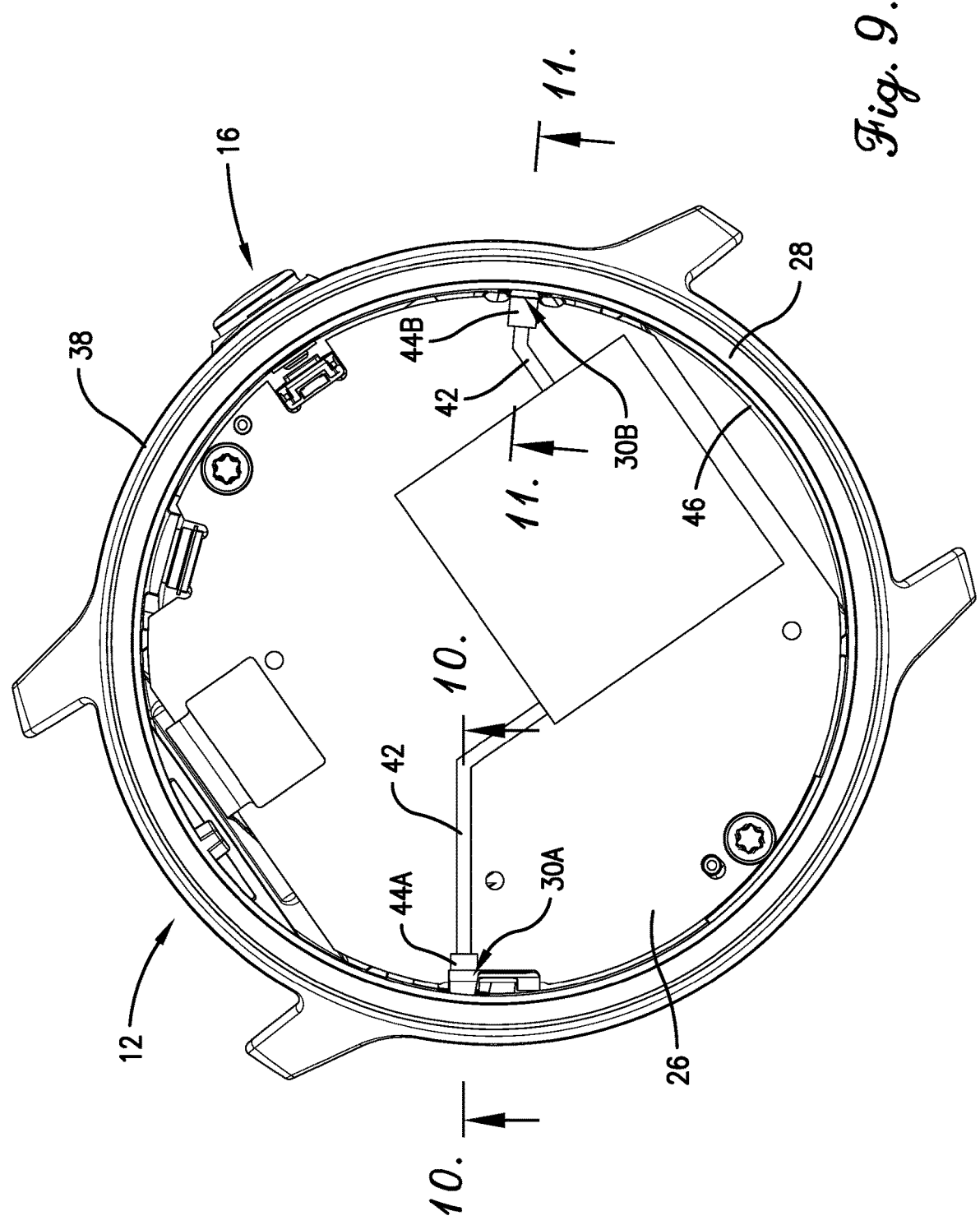
FIG. 9 is a front view of the wrist-worn electronic device with the display and the wrist band removed, depicting the locations of cut lines for the sectional views of FIGS. 10 and 11.
Figure 12:
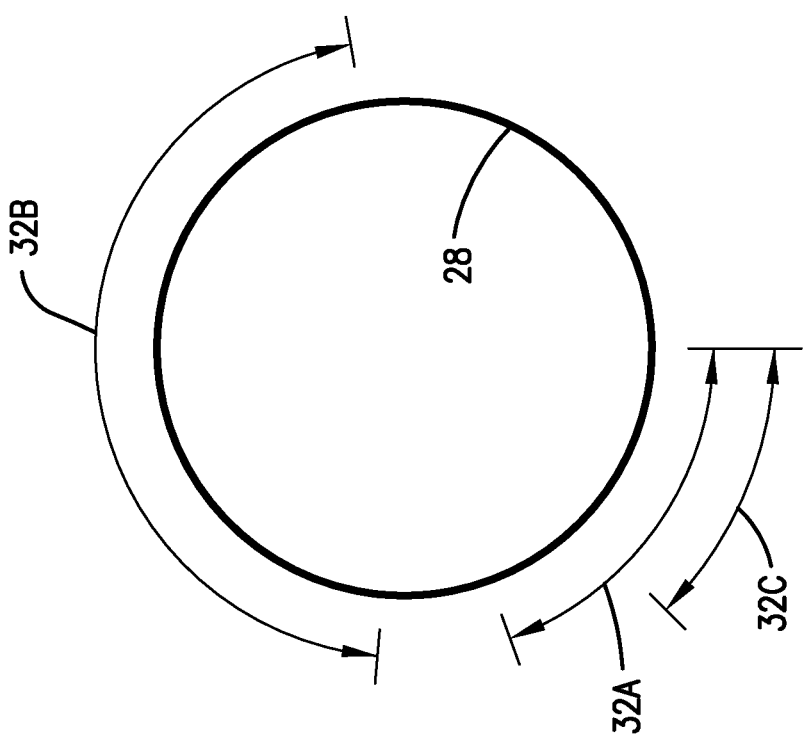
FIG. 12 is a schematic view of the frame depicting a first configuration of antenna positions with respect to the frame.

Each antenna 32 is positioned between the inner surface of the first side wall 38 and an outer surface 54 of the frame 28 such that the antenna 32 extends along a portion of the circumference, or perimeter, of the outer surface 54 of the frame 28. In some embodiments, two of the antennas 32 may be positioned such that one of the antenna 32 occupies part of the same portion of the circumference of the frame 28 as another antenna 32. For example, as shown in FIG. 12, the first communication antenna 32B is positioned to occupy a first portion of the circumference of the outer surface 54 of the frame 28 and the location receiving antenna 32A is positioned to occupy a second portion of the circumference. In this embodiment, the second communication antenna 32C is positioned to occupy part of the second portion of the circumference partially overlapping with location receiving antenna 32A along the circumference of the frame 28. While the second communication antenna 32C occupies part of the same portion of the circumference as the location receiving antenna 32A, the second communication antenna 32C is positioned below the location receiving antenna 32A, as shown in FIG. 8.

In embodiments, two or more antennas 32 may share a signal terminal. For example, the location receiving antenna 32A and the second communication antenna 32C may both electrically connect to and share the second signal terminal 44B and the second intermediate connector 30B, which collectively serve as a common electronic signal feed point (FP) to both the location receiving antenna 32A and the second communication antenna 32C. The processing element 24, the location determining element 18 and/or the communication element 20 may time or schedule transmissions of signals via the location receiving antenna 32A or the second communication antenna 32C in such a manner that the location receiving antenna 32A and the second communication antenna 32C may operate independently to receive location signals and transmit or receive communication signals without interfering with the transmission or receipt of any signals.

Figure 13:
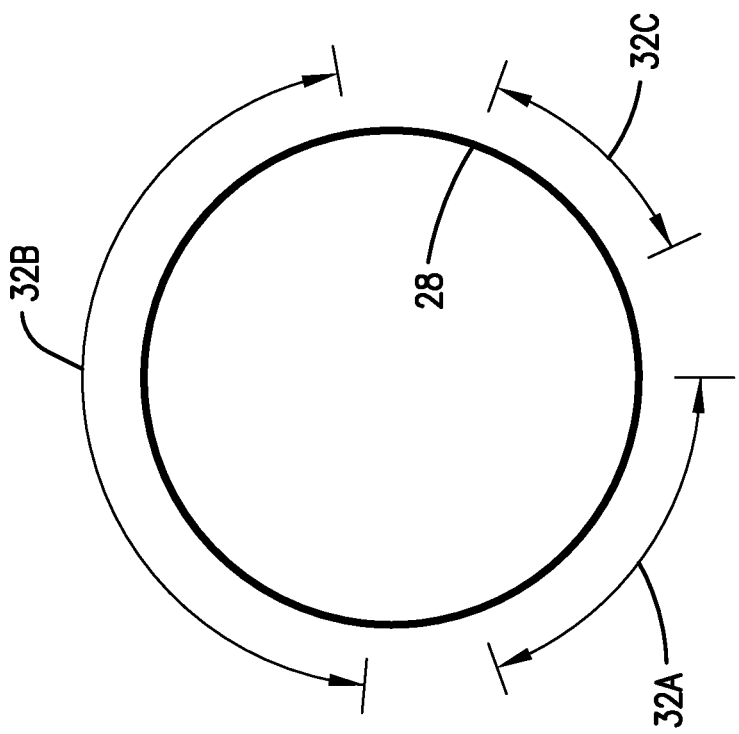
FIG. 13 is a schematic view of the frame depicting a second configuration of antenna positions with respect to the frame.

In other embodiments, each antenna 32 may be positioned to occupy a separate and non-overlapping portion of the circumference of the frame 28, as shown in FIG. 13.

Figure 14:
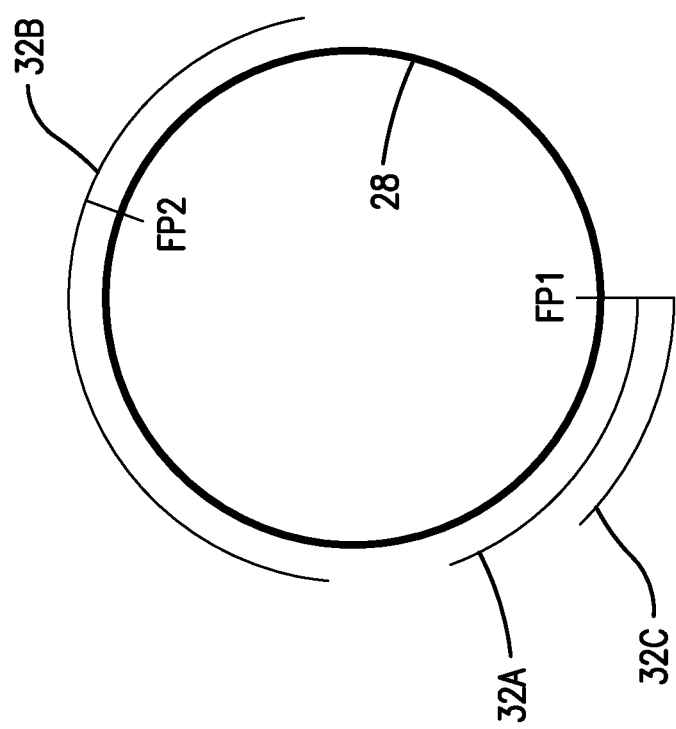
FIG. 14 is a schematic view of the frame of FIG. 12 depicting locations of electronic signal feed points with respect to the frame and antennas.

Each antenna 32 may be electrically coupled with electrically conductive elements 50 positioned on the frame 28, such that the electrically conductive element 50 serves as the feed point (FP) of the electronic signal for each antenna 32. Thus, each antenna 32 is electrically connected to an outer surface of one of the electrically conductive elements 50 at the associated electronic signal feed point. Each antenna 32 may be electrically connected to a corresponding electronic signal feed point at a point along the length of the antenna 32. The electrical connection of the feed point to each antenna 32 may exist at an off-center point along the antenna 32, the center of the antenna 32, one of the ends of the antenna 32, or any point therebetween. For example, as shown in FIG. 14, the location receiving antenna 32A and the second communication antenna 32C are electrically connected to a first electronic signal feed point FP1 at an end point of the location receiving antenna 32A and the second communication antenna 32C. In a different portion along the circumference of the frame 28, the first communication antenna 32B is electrically connected to a second electronic signal feed point FP2 at an off-center point along the length of the antenna 32B. Furthermore, it is to be understood that, while the two electronic signal feed points FP1, FP2 are positioned on the frame 28 at substantially opposite sides from one another, it is possible for the electronic signal feed points FP1, FP2 to be positioned 180 degrees apart or at other relative angular locations.

Figure 15:
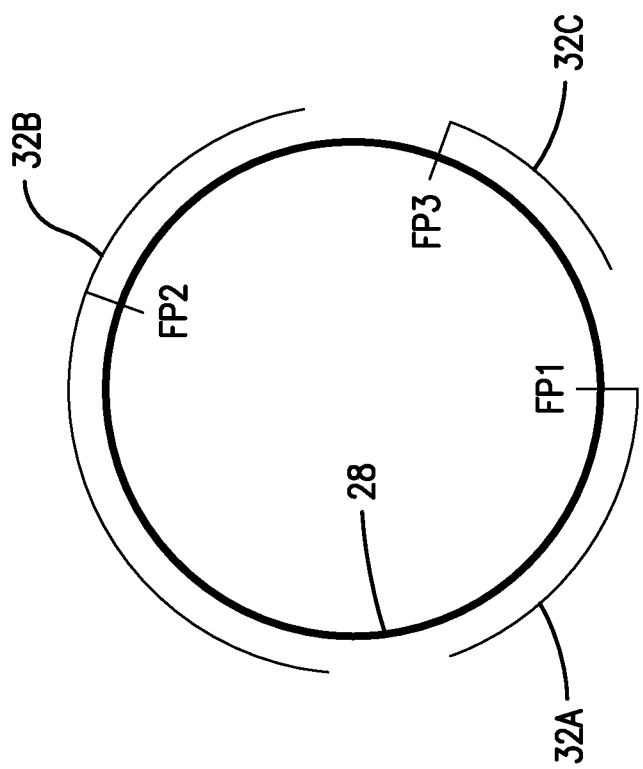
FIG. 15 is a schematic view of the frame of FIG. 13 depicting locations of electronic signal feed points with respect to the frame and antennas.
Figure 16:
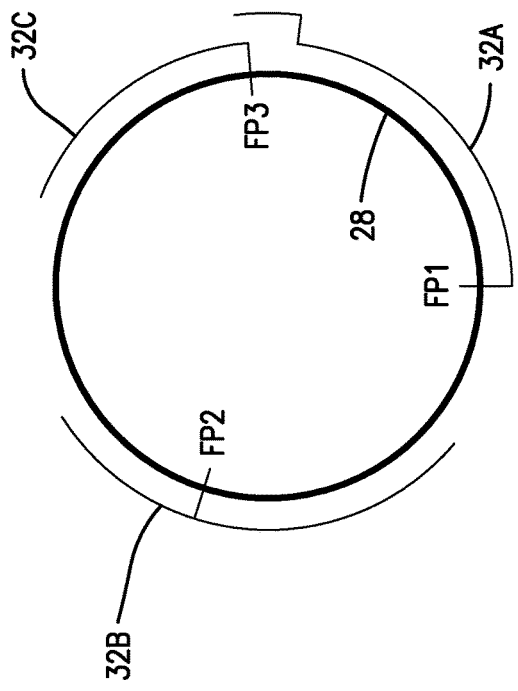
FIGS. 16-18 are schematic views of the frame depicting additional configurations of antenna positions with respect to the frame and locations of electronic signal feed points with respect to the frame and antennas.

Although the exemplary embodiments of electronic device 10 shown in FIG. 14 include just two electronic signal feed points, such that the location receiving antenna 32A and the second communication antenna 32C share the same electronic signal feed point (FP1), it is within the scope of the present technology for the electronic device 10 to include one electronic signal feed point for each antenna 32. For example, as shown in FIG. 15, the location receiving antenna 32A is electrically connected to a first electronic signal feed point FP1, the first communication antenna 32B is electrically connected to a second electronic signal feed point FP2, and the second communication protocol antenna 32C is electrically connected to a third electronic signal feed point FP3. Each electronic signal feed point FP1-FP3 are positioned at locations along the perimeter of frame 28 such that the corresponding antennas 32 do not overlap along the perimeter of frame 28. As shown in FIG. 16, in embodiments, the location receiving antenna 32A and the second communication antenna 32C extend in a direction along frame 28 that is opposite to the direction of the location receiving antenna 32A and the second communication antenna 32C as depicted in FIG. 15 without overlapping along a portion of the perimeter of frame 28.

Figure 17:
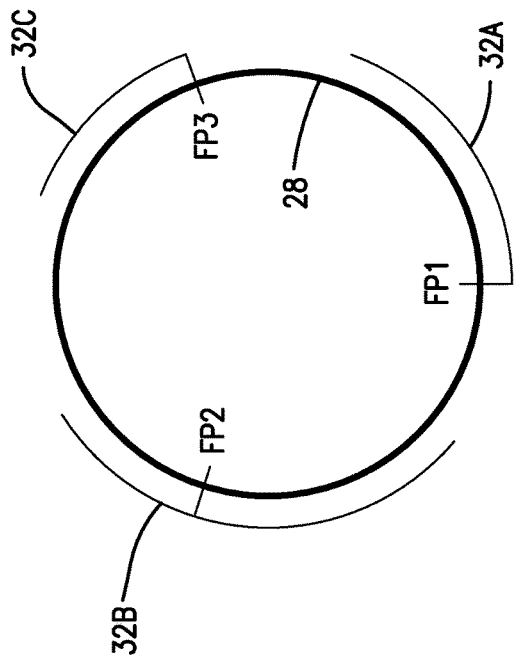

In embodiments, a portion of adjacent antennas 32 may partially overlap. For example, as shown in FIG. 17, location receiving antenna 32A may partially overlap with second communication antenna 32C. In some configurations, the extent to the overlap may enable the overlapping antenna, such as location receiving antenna 32A, to achieve an extended antenna length desirable to transmit and receive signals having a frequency of interest.

Figure 6:
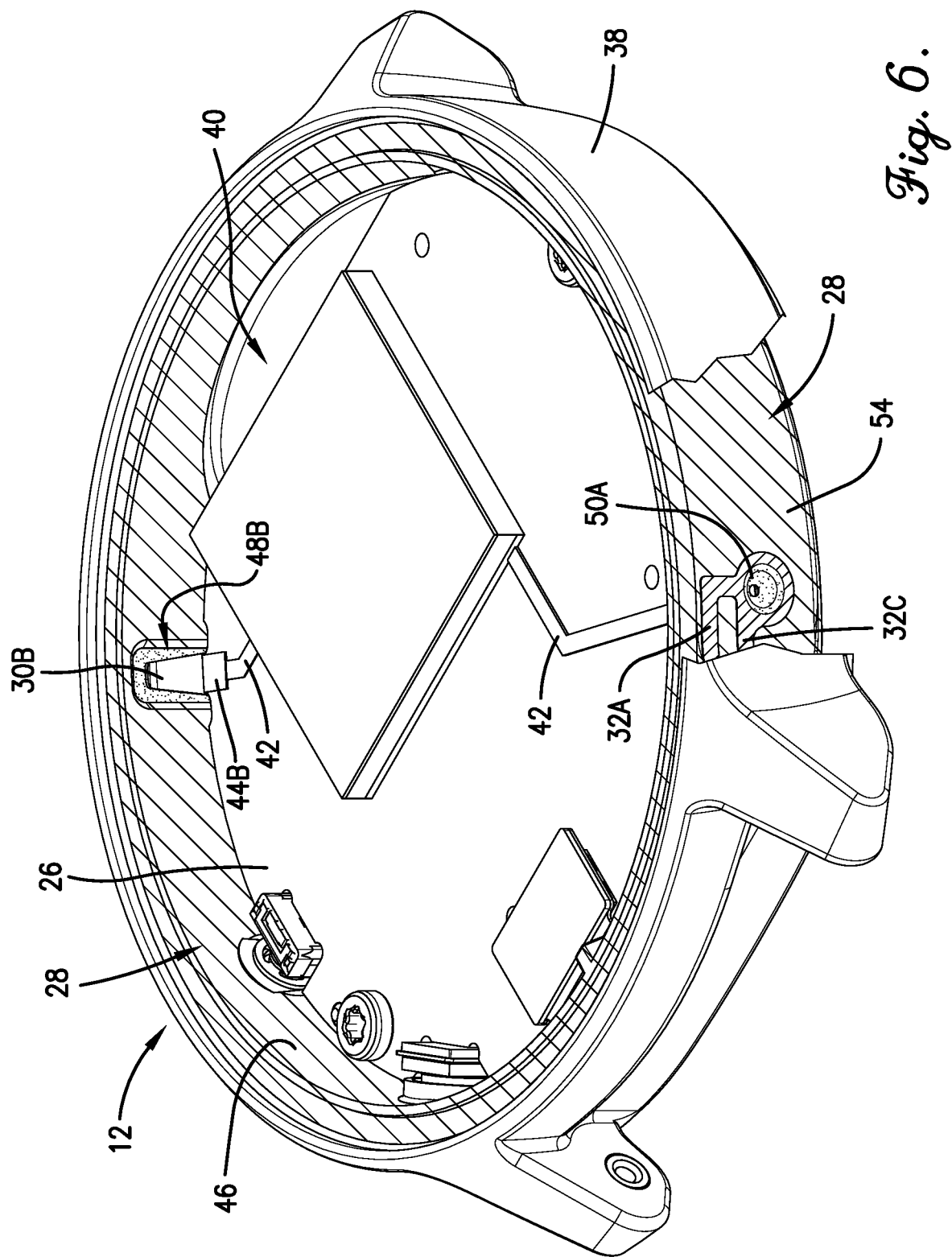
FIG. 6 is a front perspective view of the wrist-worn electronic device rotated 180 degrees from the view of FIG. 5, the view revealing portions of a second antenna and a third antenna, a second signal trace, a second signal terminal, and a second intermediate connector.
Figure 7:
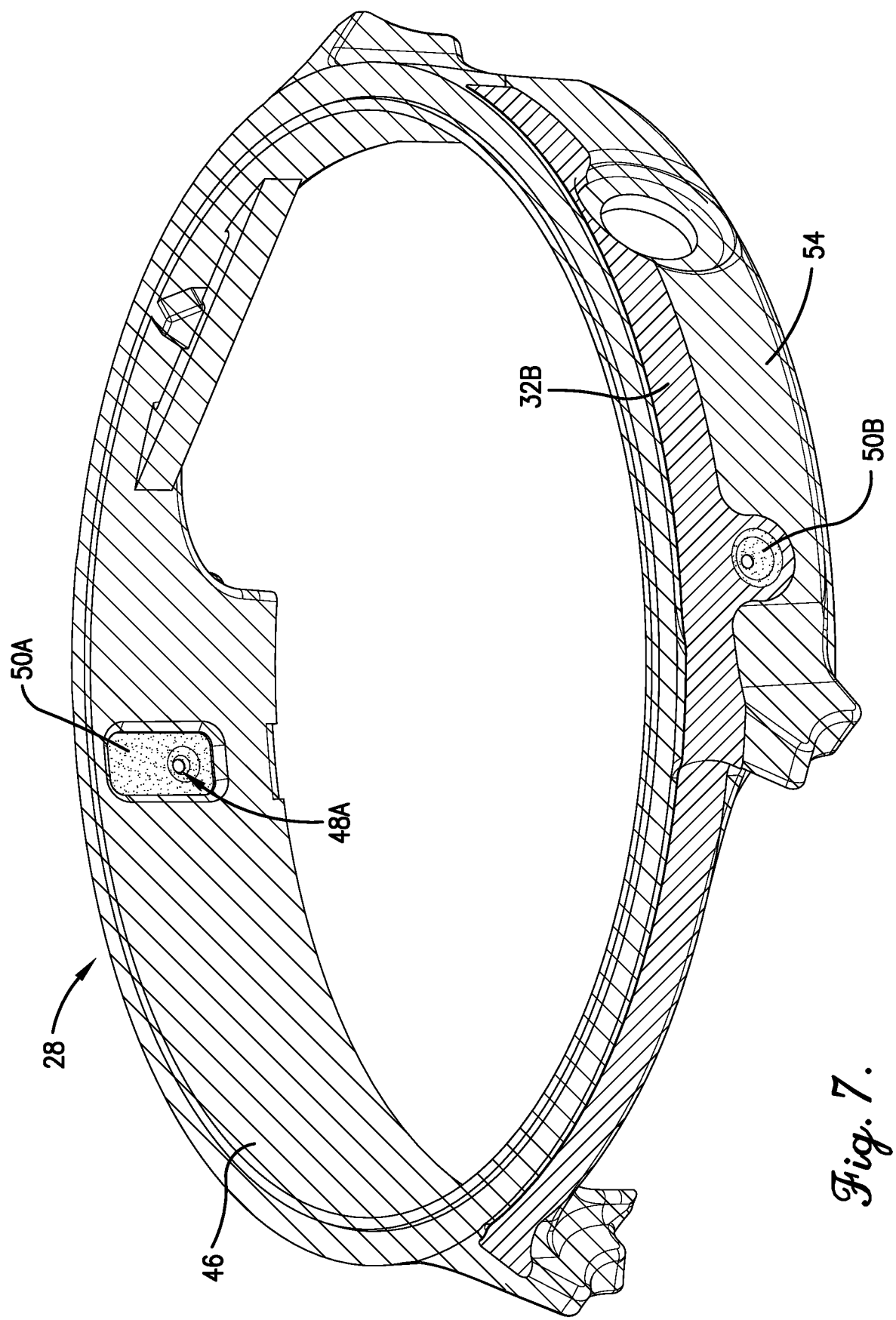
FIG. 7 is a top perspective view of the frame and the first antenna.
Figure 10:
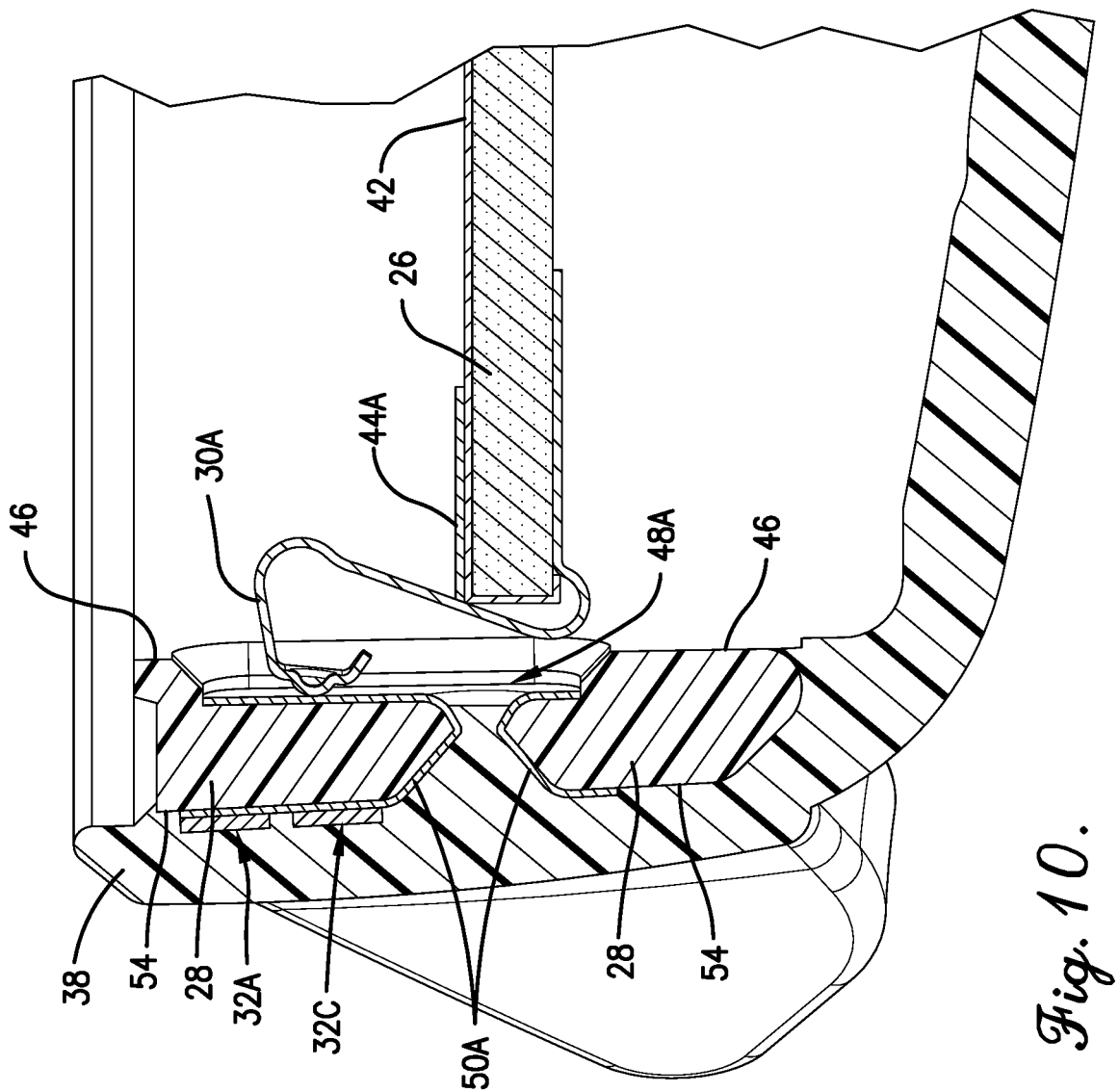
FIG. 10 is a sectional view of the wrist-worn electronic device cut along the line 10-10 of FIG. 9 illustrating the printed circuit board, the second signal trace, the second signal terminal, the second intermediate connector, an electrically conductive element, the frame, and the housing.
Figure 18:
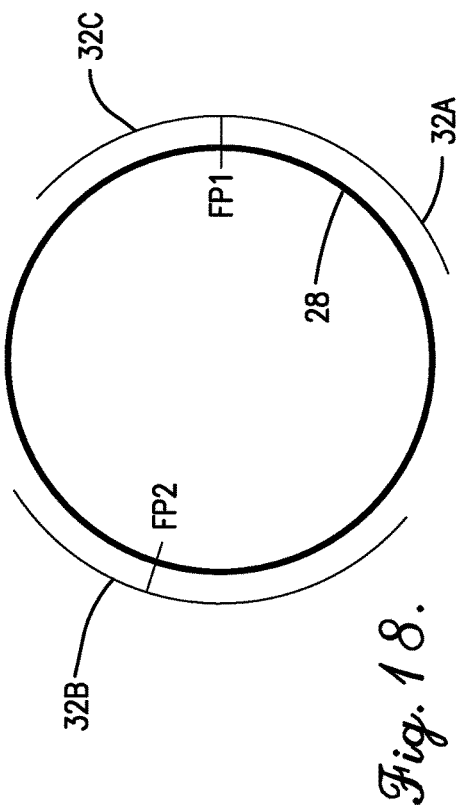

Similar to the configuration depicted in FIGS. 6 and 10 in which the location receiving antenna 32A and the second communication antenna 32C share the second signal terminal 44A and the second intermediate connector 30A (collectively serving as a common electronic signal feed point (FP) for the location receiving antenna 32A and the second communication antenna 32C), two antennas 32 may share an electronic feed point and extend in opposite directions from the signal feed point (FP) along the frame 28. For example, as shown in FIG. 18, the location receiving antenna 32A and the second communication antenna 32C may electrically connect to the first electronic signal feed point FP1 and extend in opposite directions from FP1 along frame 28. The location receiving antenna 32A and the second communication antenna 32C are of different lengths in the configuration illustrated in FIG. 18.

In addition, while the electrically conductive elements 50 have been discussed above as providing an electronic signal feed point to the antennas 32, it is within the scope of the present technology for one or more electrically conductive elements 50 to provide an electric ground feed point for one or more of the antennas 32.

In various embodiments, an exemplary electronic signal path from the antennas 32 to the electronic components with which they communicate includes the following. Electronic signals received or transmitted by an antenna 32 is communicated to or from an associated electronic component through an electrically conductive element 50, an intermediate connector 30, a signal terminal 44, and a trace 42 on the printed circuit board 26 that is electronically coupled to the associated electronic component. For example, the location signal is communicated from the location receiving antenna 32A through the first electrically conductive element 50A, the first intermediate connector 30A, the first signal terminal 44A, and a trace 42 on the printed circuit board 26 that is electrically coupled to the location determining element 18. Similarly, a first communication signal is communicated from the first communication antenna 32B through the second electrically conductive element 50B, the second intermediate connector 30B, the second signal terminal 44B, and a trace 42 on the printed circuit board 26 that is electrically coupled to the communication element 20. In embodiments, a second communication signal is communicated from the second communication antenna 32C through the first electrically conductive element 50A, the first intermediate connector 30A, the first signal terminal 44A, and a trace 42 on the printed circuit board 26 that is electrically coupled to the communication element 20.

It is to be understood that the antennas 32 may be formed and positioned between the inner surface of the first side wall 38 and an outer surface 54 of the frame 28 using any one or more of a plurality of processes. For example, each antenna 32 may be formed using laser direct structuring (LDS) applied to the outer surface 54 of the frame 28. Alternatively, each antenna 32 may be formed by applying electrically conductive element, such as silver, copper, gold, or other layer(s) of metal, between the inner surface of the first side wall 38 and an outer surface 54 of the frame 28. As another example, each antenna 32 may be formed as a metal strip or trace, either standalone or as a layer on a substrate, which can be positioned between the inner surface of the first side wall 38 and an outer surface 54 of the frame 28.

The housing 12 and the frame 28 may be constructed and assembled as follows. The frame 28 may be formed from various polymers or plastics using techniques that may involve injection molding. The frame 28 may include through holes and/or cutouts to accommodate other features of the electronic device 10. The one or more antennas 32 may be formed or placed on the outer surface 54 of the frame 28, as discussed above. Then, the first side wall 38 of the housing 12 may be formed on top of, or over, the frame 28, using injection molding techniques, with the frame 28 serving as part of the mold to form the first side wall 38 of the housing 12. Thus, the inner surface of the first side wall 38 of the housing 12 is in direct contact with the outer surface 54 of the frame 28 and with the one or more antennas 32. In such embodiments, the inner surface of the first side wall 38 integrally mates with the outer surface 54 of the frame 28 such that the frame 28 is inseparable from the first side wall 38. The inner surface of the first side wall 38 and the outer surface 54 of the frame 28 may make contact without having any air gaps. In other embodiments, one or more air gaps may exist between the inner surface of the first side wall 38 and the outer surface 54 of the frame 28. In many cases, there is natural adhesion between the materials of the frame 28 and the first side wall 38 of the housing 12. In some cases, the frame 28 may also include elements and features that extend or protrude outward from the outer surface 54 of the frame 28 that interlock with corresponding elements and features that extend or protrude outward from the inner surface of the first side wall 38 that combine the frame 28 and the first side wall 38 together in addition to injection molding the first side wall 38 to the frame 28.

Alternatively, the frame 28 and the first side wall 38 may each be formed separately from polymers, plastics, or other materials using techniques that may involve molding or other processes. The one or more antennas 32 may be formed or placed on the outer surface 54 of the frame 28, as discussed above. Then, the frame 28 and the one or more antennas 32 are placed inside the first side wall 38 such that the inner surface of the first side wall 38 is in direct contact with the outer surface 54 of the frame 28 and with the one or more antennas 32. Frictional forces may hold the frame 28 and the antennas 32 in place against the first side wall 38 of the housing 12. The frame 28 may include elements and features that extend or protrude outward from the outer surface 54 of the frame 28 that interlock with corresponding elements and features that extend or protrude outward from the inner surface of the first side wall 38 that combine the frame 28 and the first side wall 38 together. The interlocking elements and features of the frame 28 and the first side wall 38 be utilized in place of injection molding the first side wall 38 to the frame 28

Although the technology has been described with reference to the embodiments illustrated in the attached drawing

The invention claimed is:

1. A wrist-worn electronic device comprising:
   a housing including a lower wall configured to contact a wearer's wrist and a first side wall of the electronic device coupled to the lower wall, the first side wall including an inner surface;
   a frame having a second side wall of the electronic device and including an inner surface and an outer surface, the frame positioned within the housing such that the first side wall integrally mates with the second side wall and an internal cavity is formed in part by the lower wall and the second side wall;
   a location determining element configured to determine a current geolocation of the electronic device based on a location signal;
   a first antenna in electronic communication with the location determining element and configured to receive the location signal, the first antenna positioned on the outer surface of the second side wall between the frame and the housing and extending along a first portion of the perimeter of the frame; and
   wherein the first side wall and the second side wall to be substantially formed of non-conductive material.

2. The wrist-worn electronic device of claim 1, wherein the second side wall has a similar overall shape and structure to the first side wall.

3. The wrist-worn electronic device of claim 1, wherein the outer surface of the second side wall contacts at least a portion of the inner surface of the first side wall.

4. The wrist-worn electronic device of claim 1, further comprising a second antenna configured to receive a first communication signal, the second antenna positioned between the inner surface of the first side wall and the outer surface of the second side wall and extending along a second portion of the perimeter of the frame.

5. The wrist-worn electronic device of claim 4, wherein the outer surface of the second side wall contacts the first antenna, the second antenna, and at least a portion of the inner surface of the first side wall.

6. The wrist-worn electronic device of claim 4, further comprising
   a communication element in electronic communication with the second antenna and configured to receive and process the first communication signal.

7. The wrist-worn electronic device of claim 4, further comprising a third antenna configured to receive a second communication signal, the third antenna positioned between the inner surface of the first side wall and the outer surface of the second side wall and extending along the first portion or the second portion of the perimeter of the frame.

8. The wrist-worn electronic device of claim 4, further comprising a third antenna in electronic communication with the communication element and configured to receive a second communication signal, the third antenna positioned between the inner surface of the first side wall and the outer surface of the second side wall and extending along the first portion or the second portion of the perimeter of the frame.

9. The wrist-worn electronic device of claim 1, wherein the frame includes an opening in the second side wall through which an electrically conductive element is positioned, the electrically conductive element making an electrical connection to the first antenna.

10. The wrist-worn electronic device of claim 9, further comprising
    a printed circuit board configured to retain the location determining component, the printed circuit board including a signal terminal positioned on an edge of the printed circuit board and an electrically conductive signal trace electrically coupling the location determining component with the signal terminal, and
    an electrically conductive intermediate connector electrically connecting the signal terminal to the electrically conductive element positioned in the opening in the second side wall.

11. The wrist-worn electronic device of claim 10, wherein a signal path between the first antenna and the location determining component is formed through the electrically conductive element, the intermediate connector, the signal terminal, and the signal trace.

12. A wrist-worn electronic device comprising:
    a housing including a lower wall configured to contact a wearer's wrist and a first side wall of the electronic device coupled to the lower wall, the first side wall including an inner surface;
    a frame having a second side wall of the electronic device and including an inner surface and an outer surface, the frame positioned within the housing such that the first side wall integrally mates with the second side wall and an internal cavity is formed in part by the lower wall and the second side wall of the frame;
    a communication element configured to process a first communication signal;
    a first antenna in electronic communication with the communication element and configured to receive the first communication signal, the first antenna positioned on the outer surface of the second side wall between the frame and the housing and extending along a first portion of the perimeter of the frame; and
    wherein the first side wall and the second side wall to be substantially formed of non-conductive material.

13. The wrist-worn electronic device of claim 12, wherein the second side wall has a similar overall shape and structure to the first side wall.

14. The wrist-worn electronic device of claim 12, wherein the outer surface of the second side wall contacts at least a portion of the inner surface of the first side wall.

15. The wrist-worn electronic device of claim 12, further comprising a second antenna configured to receive a location signal and a location determining element configured to determine a current geolocation of the electronic device based on the location signal, the second antenna positioned between the inner surface of the first side wall and the outer surface of the second side wall and extending along a second portion of the perimeter of the frame.

16. A wrist-worn electronic device comprising:
    a housing including a lower wall configured to contact a wearer's wrist and a first side wall of the electronic device coupled to the lower wall, the first side wall including an inner surface;
    a frame having a second side wall of the electronic device and including an inner surface and an outer surface, the frame positioned within the housing such that the first side wall integrally mates with the second side wall and an internal cavity is formed in part by the lower wall and the second side wall;

a location determining element configured to determine a current geolocation of the electronic device based on a location signal;

a communication element configured to process a first communication signal;

a first antenna in electronic communication with the location determining element and configured to receive the location signal, the first antenna positioned on the outer surface of the second side wall between the frame and the housing and extending along a first portion of the perimeter of the frame;

a second antenna in electronic communication with the communication element and configured to receive the first communication signal, the second antenna positioned on the outer surface of the second side wall between the frame and the housing and extending along a second portion of the perimeter of the frame, such that the outer surface of the second side wall contacts the first antenna, the second antenna, and at least a portion of the inner surface of the first side wall; and wherein the first side wall and the second side wall to be substantially formed of non-conductive material.

17. The wrist-worn electronic device of claim 16, wherein the second side wall has a similar overall shape and structure to the first side wall.

18. The wrist-worn electronic device of claim 16, wherein the frame includes two openings in the second side wall through which a first electrically conductive element and a second electrically conductive element are positioned, respectively, the first electrically conductive element making an electrical connection to the first antenna and the second electrically conductive element making an electrical connection to the second antenna.

19. The wrist-worn electronic device of claim 16, further comprising:

a printed circuit board configured to retain the location determining element and the communication element, the printed circuit board including a first electrically conductive signal terminal and a second electrically conductive signal terminal each positioned on an edge of the printed circuit board and first electrically conductive signal trace and a second electrically conductive signal trace electrically connected to the first and second signal terminals, respectively, and a first electrically conductive intermediate connector and second electrically conductive intermediate connector electrically connecting the first and second signal terminals to the first and second electrically conductive elements, respectively.

20. The wrist-worn electronic device of claim 19, wherein a first signal path between the first antenna and the location determining component is formed through the first electrically conductive element, the first intermediate connector, the first signal terminal, and the first signal trace, and wherein a second signal path between the second antenna and the communication element is formed through the second electrically conductive element, the second intermediate connector, the second signal terminal, and the second signal trace.

* * * * *